A. COLLINS & A. MAYNARD.
Combined Harvesters and Thrashers.
No. 153,703. Patented Aug. 4, 1874.
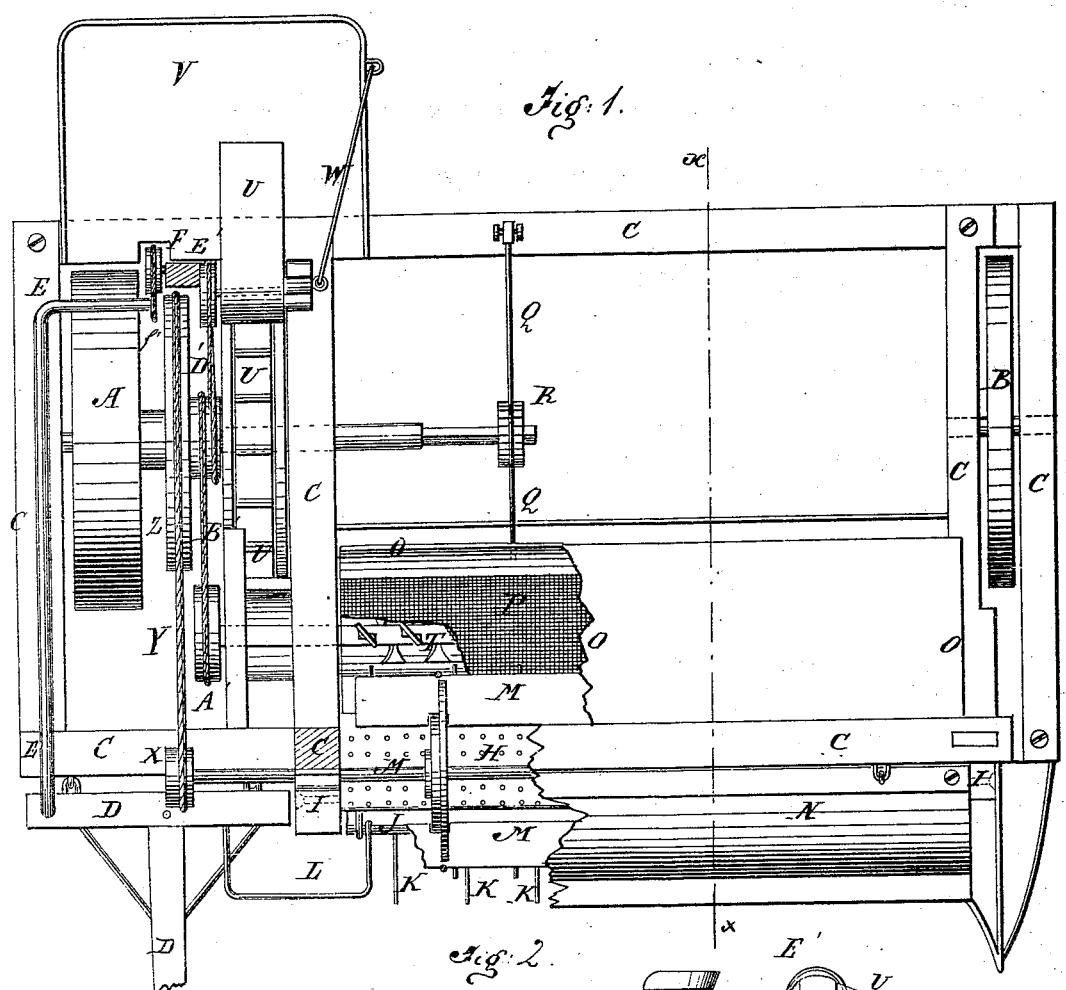
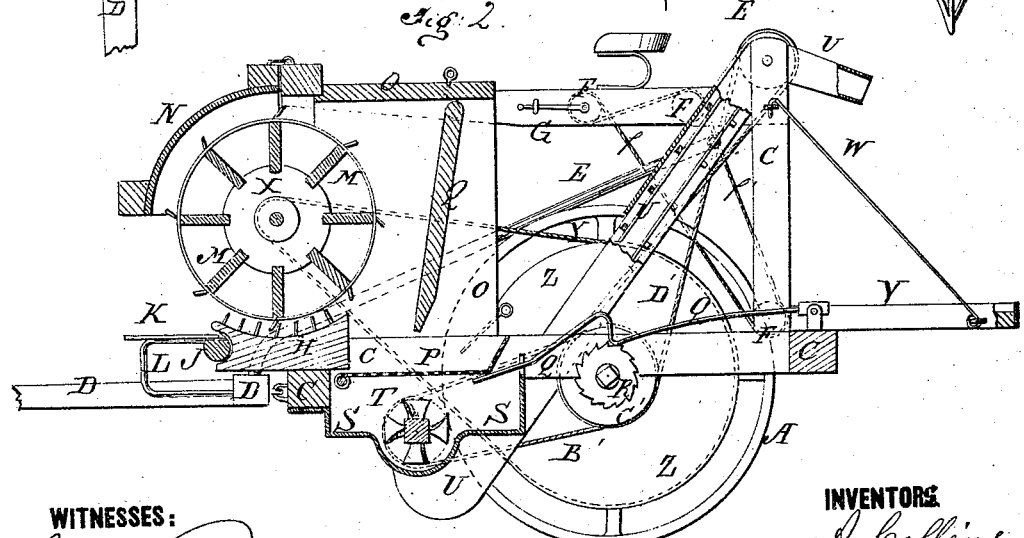
WITNESSES:
Chas. Nida
Alex F. Roberts
INVENTORS:
A. Collins
A. Maynard
BY
ATTORNEYS.

UNITED STATES PATENT OFFICE.

ALFRED COLLINS AND ARAD MAYNARD, OF JANESVILLE, IOWA.

IMPROVEMENT IN COMBINED HARVESTERS AND THRASHERS.

Specification forming part of Letters Patent No. 153,703, dated August 4, 1874; application filed January 5, 1874.

*To all whom it may concern:*

Be it known that we, ALFRED COLLINS and ARAD MAYNARD, of Janesville, in the county of Bremer and State of Iowa, have invented a new and useful Improvement in Machine for Thrashing Standing Grain, of which the following is a specification:

Figure 1 is a top view of our improved machine, part being broken away to show the construction. Fig. 2 is a vertical cross-section of the same taken through the line $x\ x$, Fig. 1.

Similar letters of reference indicate corresponding parts.

Our invention has for its object to furnish an improved machine for thrashing standing grain, which shall be simple in construction, convenient in use, and effective and reliable in operation, thrashing, cleaning, and sacking the grain.

The invention will first be fully described, and then pointed out in the claims.

A B are the wheels, the journals of which revolve in bearings attached to the frame C. To the front cross-bar of the frame C is pivoted the tongue D. To the tongue D, in front of the drive-wheel A, is rigidly attached the forward end of a lever, E, which projects to the rearward, and the rear end of which is attached to an endless band or chain, $f'$, which passes around three guide-pulleys, F, pivoted to the frame-work of the machine. To the journal of one of the pulleys F is attached a crank, G, so that by operating the said crank the frame-work of the machine may be readily adjusted at any desired inclination, according to the height of the grain. H is the concave of the thrasher, the ends of which are secured to the frame C by bolts I passing through slots in the said frame, so that by loosening the said bolts I the concave may be adjusted as required. The concave H is provided with spikes or teeth in the ordinary way, and its forward edge is concaved or grooved longitudinally to receive a rod or shaft, J, which is secured in place by keepers attached to the said concave H, and is provided with fingers K to raise bent or broken stalks, and bring their heads into proper position to be operated upon. The shaft J is rigidly connected with the tongue D by a bar, L, so that its fingers K may always be held in the same position, however the concave H and frame C may be adjusted. M is the thrashing wheel or cylinder, which consists of a series of radial wings attached to a shaft which revolves in bearings attached to the uprights of the forward vertical part of the frame C. To the edges of the wings of the thrashing-wheel M are attached teeth which are bent backward at an angle of about forty-five degrees, (45°,) to prevent thrashing the grain before it has come upon the concave. The wings of the wheel M are made wide to cause them to act as the wings of a fan-wheel for causing a blast for clearing the grain. The upper forward part of the wheel M is covered with a lid, N, which is hinged at its upper edge to enable the blast to be more readily controlled. The rear part of the wheel M is inclosed by a box or casing, O, the back board of which is pivoted at its upper edge so that it may be adjusted, as required, for controlling the blast.

The thrashed grain and the chaff pass from the concave H to the screen P, placed at the rear edge of the concave H, and hinged at its forward edge to the frame C, so that it may be jarred to facilitate the passage of the grain through it. The screen P has its rear edge inclined upward more or less, as may be desired, and is jarred by the lever Q, the forward end of which passes beneath the rear edge of the said screen P, and its rear end is pivoted to the rear part of the frame C. The lever Q has a shoulder formed upon it, which rests upon the teeth of the wheel R attached to the projecting inner end of the shaft of the drive-wheel A, so that the screen P may be jarred by the revolution of the said drive-wheel A.

From the screen P the grain drops into a box or trough, S, placed beneath it, and connected with the frame C. In the lower part of the box S revolves a screw, T, by which the grain is fed to the elevator U, to the spout of which are attached sacks or bags to receive the said grain.

V is a platform for the attendant to stand upon in attending to the sacks. The platform V is hinged at its forward edge to the rear part of the frame C, so that it may be turned up out of the way when not required for use, and is secured in either position by a rod, W, which hooks into staples or eyebolts attached to the frame-work of the machine.

To the end of the shaft of the thrashing-wheel M is attached a pulley, X, around which passes a belt, Y, which also passes around a pulley, Z, attached to the shaft of the drive-wheel A. To the end of the feed-screw T is attached a pulley, A', around which passes a belt, B', which also passes around a pulley, C', attached to the shaft of the drive-wheel A. Around the pulley C' also passes a belt, D', which passes around a pulley, E', attached to the journal of one of the rollers of the elevator U.

Having thus described our invention, what we claim as new, and desire to secure by Letters Patent, is—

1. The toothed concave H and toothed shaft J K, constructed and arranged in connection with each other and with the frame C and tongue D, so that the tongue and shaft have the same vertical motion, substantially as herein shown and described.

2. The hinged lid N and casing O, having its back board adjustable, in combination with the thrasher M, shaft J, teeth K, and screen P, substantially as herein shown and described.

3. The combination of the toothed wheel R and shouldered lever Q with the shaft of the drive-wheel A and with the screen P, substantially as herein shown and described.

ALFRED COLLINS.
ARAD MAYNARD.

Witnesses:
C. M. WYANT,
A. I. PROSSER.